United States Patent
Wagle et al.

(10) Patent No.: US 11,725,129 B2
(45) Date of Patent: Aug. 15, 2023

(54) LOW-END RHEOLOGY MODIFIER FOR OIL BASED DRILLING FLUIDS

(71) Applicant: SAUDI ARABIAN OIL COMPANY, Dhahran (SA)

(72) Inventors: Vikrant Wagle, Dhahran (SA); Abdullah Alyami, Dhahran (SA); Omprakash Pal, Dhahran (SA); Ali Al-Safran, Dhahran (SA); Abdulaziz Alhelal, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/647,280

(22) Filed: Jan. 6, 2022

(65) Prior Publication Data

US 2023/0212449 A1  Jul. 6, 2023

(51) Int. Cl.
   *C09K 8/36* (2006.01)
   *E21B 21/00* (2006.01)

(52) U.S. Cl.
   CPC .............. *C09K 8/36* (2013.01); *E21B 21/00* (2013.01)

(58) Field of Classification Search
   CPC .................................. C09K 8/36; E21B 21/00
   See application file for complete search history.

(56) References Cited

U.S. PATENT DOCUMENTS

| | | | |
|---|---|---|---|
| 4,801,304 A * | 1/1989 | Polanco | C10L 1/328 166/371 |
| 7,939,470 B1 | 5/2011 | Wagle et al. | |
| 8,936,111 B2 | 1/2015 | Maghrabi et al. | |
| 8,950,492 B2 | 2/2015 | Maghrabi et al. | |
| 9,127,192 B2 | 9/2015 | Maghrabi et al. | |
| 9,296,937 B2 | 3/2016 | Wagle et al. | |
| 9,296,941 B2 | 3/2016 | Wagle et al. | |
| 9,346,995 B2 | 5/2016 | Wagle et al. | |
| 9,469,803 B2 | 10/2016 | Wagle et al. | |
| 9,518,206 B2 | 12/2016 | Maghrabi et al. | |
| 9,796,907 B2 | 10/2017 | Wagle et al. | |
| 9,988,569 B2 | 6/2018 | Wagle et al. | |
| 10,030,189 B2 | 7/2018 | Wagle et al. | |
| 10,214,675 B2 | 2/2019 | Wagle et al. | |
| 10,457,847 B2 | 10/2019 | Wagle et al. | |
| 10,570,326 B2 | 2/2020 | Wagle et al. | |
| 2004/0067855 A1* | 4/2004 | Hughes | C09K 23/00 507/200 |
| 2008/0248977 A1* | 10/2008 | Knox | C09K 8/68 507/240 |
| 2016/0230070 A1 | 8/2016 | Wagle et al. | |
| 2017/0342341 A1 | 11/2017 | Maker et al. | |
| 2019/0016947 A1* | 1/2019 | Mahmoud | C09K 8/74 |
| 2020/0087563 A1 | 3/2020 | Wagle et al. | |
| 2020/0148934 A1* | 5/2020 | Wagle | C09K 8/035 |
| 2021/0009889 A1 | 1/2021 | Ramasamy et al. | |

OTHER PUBLICATIONS

Wagle, Vikrant, et al., "Design, Qualification and Field Deployment of Low ECD Organoclay-free Invert Emulsion Drilling Fluids", SPE-201847-MS, SPE Russian Petroleum Technology Conference, Society of Petroleum Engineers, Oct. 2020, pp. 1-21 (21 pages).

* cited by examiner

*Primary Examiner* — Alicia Bland
(74) *Attorney, Agent, or Firm* — Osha Bergman Watanabe & Burton LLP

(57) ABSTRACT

Provided is an invert emulsion oil-based drilling fluid composition that may include an invert emulsion of an oil phase and an aqueous phase. The oil phase may include an oleaginous fluid. The composition may include a low-end rheology modifier that is a C-36 dimer diamine dihydrochloride salt. Further provided is a method that may include introducing the invert emulsion oil-based drilling fluid composition into a wellbore.

18 Claims, No Drawings

LOW-END RHEOLOGY MODIFIER FOR OIL BASED DRILLING FLUIDS

BACKGROUND

When drilling an oil or gas well, drilling fluid (mud) enables cuttings removal and solids suspension. As the well is drilled deeper, pressure and temperature change, and the rheology of the drilling fluid changes at depth. These rheology changes may result in increased equivalent circulating density (ECD). The ECD is the effective density that combines mud density and annular pressure drop.

ECD fluctuations may limit how deep a well section may be drilled and can lead to formation fractures, causing mud loss into the formation. Mud properties, bottom hole assembly types and configurations, filter cake thickness, and bit total flow area may affect well pressures and contribute to ECD fluctuations.

In some instances, thinner fluids than the mud are added when drilling to mitigate rheology fluctuations that may result in lower ECDs compared to when using the mud itself. However, addition of a thinner fluid affects low-end rheology and other rheological properties of the fluid, which may impair the ability of the mud to remove cuttings or suspend solids.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, one or more embodiments of the disclosure may relate to an invert emulsion oil-based drilling fluid composition comprising an invert emulsion of an oil phase and an aqueous phase. The oil phase may include an oleaginous fluid. The composition may include a low-end rheology modifier that is a C-36 dimer diamine dihydrochloride salt.

In another aspect, one or more embodiments of the disclosure may relate to a method comprising introducing the invert emulsion oil-based drilling fluid composition into a wellbore, where the wellbore may have a temperature of up to 450° F. (232° C.) and a pressure of up to 30,000 pounds per square inch (psi) (207 megapascals (MPa)).

Other aspects and advantages of this disclosure will be apparent from the following description made with reference to the accompanying appended claims.

DETAILED DESCRIPTION

One or more embodiments in accordance with the present disclosure generally relate to a drilling fluid ("mud") including a C-36 dimer diamine dihydrochloride salt ("CDDH"), to be described, as a low-end rheology modifier (also known as a viscosifier). One or more embodiments relate to an invert emulsion oil-based drilling fluid composition including CDDH, and related methods that can improve yield point, plastic viscosity, low shear rheology such as low shear yield point, and barite sag rheology of these drilling fluids, among other things. "Low shear" means a shear rate measured at 3 revolutions per minute (rpm) and 6 rpm as known to those of ordinary skill in the art. For example, a shear rate at 3 rpm and 6 rpm may be measured by using a FANN® model 35 viscometer.

In particular, when drilling formations, an invert emulsion (water-in-oil or W/O emulsion) oil-based drilling fluid may be used to stabilize the formation. The invert emulsion oil-based drilling fluid may include a conventional viscosifier in addition to CDDH. The conventional viscosifier may include solids in a mixture with a liquid or may be a solid. The solid or solids may include but are not limited to clay, such as an organophilic clay (organoclay), and silica.

The conventional viscosifier may be added to a drilling fluid to provide a desired rheological property for drilling operations. However, conventional viscosifiers such as organoclay may contain a high content of solids (such as greater than 5 pounds per barrel (ppb)) and there is a limit to how much solid may be added before the drilling fluid properties are affected. When this high content of solids is added to the drilling fluid, formation or equipment damage may result. A high content of solids also contributes to a higher circulating density than a low content of solids.

At deeper well depths, a phenomenon occurs where organoclay-based mud loses low-end rheology properties. To counteract this, excess organoclay or low gravity solids may be added to the well. If the formation is fractured, more drilling fluid is added while drilling with even more conventional viscosifier. This over-treatment of drilling fluid and organoclay is all too common. Over-treatment is costly and negatively impacts drilling fluid properties and ECDs. Such negative impacts also increase barite sag in mud, resulting in variations in mud density in the well bore.

In addition, a conventional viscosifier alone may not maintain a desired rheological property when added to a drilling fluid. Failure to maintain a desired rheological property may result in solids settling, barite sagging, and cuttings build up within the drilling fluid or wellbore. A "desired rheological property" includes improved low shear rheology, according to one or more embodiments of the present disclosure (such as improved low shear rheology when using a composition with CDDH compared to low shear rheology when using a composition without CDDH). Low shear rheology may include one or more rheological property according to one or more embodiments of the present disclosure, especially in high density muds. As used herein, "low shear rheology" refers to a property of the mud when the agitation or shear rate is low, for example, as measured by using a FANN® model 35 viscometer at 3 or 6 rpm. As may be appreciated by those skilled in the art, while the low shear rheological properties are described in detail in the present disclosure, improvements in rheological properties at higher shear rates (than those of low shear rheology) may also be achieved by the compositions disclosed herein.

Low shear rheology as described herein may include having a viscosity range at a particular shear rate in revolution per minute (rpm), such as a viscosity at 3 rpm, or at 6 rpm. In addition, one or more additional viscosity ranges may further define the low shear rheology, such as a viscosity at 100 rpm, 200 rpm, 300 rpm, and 600 rpm. For example, at 3 revolutions per minute (rpm) viscosity may be in a range of greater than 8 centipoise (cP), such as from 8 to 20 cP or from 8 to 15 cP. At 6 rpm, viscosity may be in a range of greater than 8 cP, such as from 8 to 20 cP, from 8 to 15 cP, or from 8 to 12 cP. Viscosity may be in a range of from 20 to 30 cP at 100 rpm. Viscosity may be in a range of from 25 to 35 at 200 rpm. Viscosity may be in a range of from 35 to 55 rpm at 300 rpm. Viscosity may be in a range of from 50 to 80 cP at 600 rpm. In addition, low shear rheology may include a plastic viscosity in a range from 20 to 100 cP. Low shear rheology may include a yield point in a range from 15 to 50 pounds per hundred square feet (lb/100 ft$^2$) (from about 0.7 to about 2.4 kilograms per square meter (kg/m$^2$)). Low shear rheology may include a low shear yield point of from 5 to 15 lb/100 ft$^2$ (from about 0.24 to about 0.73 kg/m$^2$). Low shear rheology may include a 10 second gel strength may be in a range from 5 to 25 lb/100 ft$^2$ (from about 0.24 to about 1.22 kg/m$^2$). Low shear rheology may include a 10-minute gel strength in a range from 5 to 35 lb/100 ft$^2$ (from about 0.24 to about 1.71 kg/m$^2$). Low shear rheology may include a 30-minute gel strength in a range from 6 to 50 lb/100 ft$^2$ (from about 0.24 to about 4.88 kg/m$^2$).

One or more embodiments of the disclosure relate to a drilling fluid composition and a method of use. The composition and method allow for no or a minimal amount of organoclay to be added to the drilling fluid compared to existing methods, while retaining low-end rheology and resisting barite sag.

One or more embodiments of the present disclosure relate to an invert emulsion oil-based drilling fluid composition including a low-end rheology modifier (viscosifier), CDDH.

In one or more embodiments, a method to use the composition is provided. The method includes introducing the composition of one or more embodiments into a wellbore.

With the composition or method according to one or more embodiments, the drilling fluid may maintain a desired rheological property, including low shear rheology, compared to when the composition or method are not applied.

Composition: Invert Emulsion Oil-Based Drilling Fluid Composition

In one or more embodiments, the composition includes an invert emulsion oil-based drilling fluid composition including CDDH. An invert emulsion has a continuous (external) oleaginous phase and a dispersed (internal) immiscible phase. In one or more embodiments, the continuous phase is an oil phase, and the dispersed phase is an aqueous phase. The composition may also include an amount of a conventional viscosifier.

The composition may include oil, water, a saline agent, a low-end rheology modifier (CDDH), a weighting agent, an alkaline source, an emulsifier, a filtration control agent, a solid viscosifier, or a combination thereof.

The density of the composition is from about 1281 kilogram per cubic meter (kg/m$^3$) to about 1602 kg/m$^3$ (about 80 to 100 pounds per cubic foot (pcf)). The oil to water ratio of the composition is from 60:40 to 90:10 with respect to volume. The CaCl$_2$ water phase salinity concentration of the composition is from 150,000 parts per million (ppm) to 350,000 ppm.

The composition comprises an oil phase including an oleaginous fluid such as a crude oil, a condensate, a light hydrocarbon liquid, a base oil including but not limited to a linear alpha olefin, a cycloparaffin, a linear paraffin, or an N-alkane, a fraction thereof, a derivative thereof, or a combination thereof. In one or more embodiments, the oil phase is diesel fuel. The oleaginous fluid may be present in a range of 25 to 65 weight percent (wt %) compared to the total weight of the composition.

The composition includes an inverted phase, called an aqueous phase. The water of the aqueous phase may be any form of water, including, but not limited to, deionized water; filtered or raw fresh waters; mineral waters; filtered, raw or synthetic seawater; brackish water; synthetic or natural brines; salt water; formation water; and produced water. The aqueous phase may contain an amount of organic material from natural or artificial sources as long as the function of the composition, which is to provide the invert emulsion, is not inhibited. The aqueous phase may contain an amount of minerals or metals from natural or artificial sources as long as the function of the composition is not inhibited. The aqueous phase may contain an amount of monovalent ions, multivalent ions, and combinations thereof. The aqueous phase may be present in a range of 3 to 20 wt % compared to the total weight of the composition.

In one or more embodiments, the aqueous phase is water combined with a saline agent, including monovalent and divalent salts such as sodium or calcium salts. A saline agent may include but is not limited to calcium chloride, calcium citrate, calcium acetate, calcium nitrate, calcium bromide, or a combination thereof. Thus, the aqueous phase may be a brine, such as a calcium chloride-based brine. The saline agent may be included to adjust the salinity of the aqueous phase and to provide a source of calcium. The saline agent may reduce the water activity of the aqueous phase compared to an aqueous phase without a saline agent. The weight ratio of saline agent to water may be from 1:1 to 1:5, such as from about 1:1 to about 1:4, from about 1:1 to about 1:3.5, from about 1:1 to about 1:3, from about 1:1 to about 1:2.5, from about 1:1 to about 1:2, and from about 1:1 to about 1:1.5. The saline agent may be present in a range of from 1 to 10 wt % compared to the total weight of the composition.

As previously mentioned, the invert emulsion oil-based drilling fluid composition includes the low-end rheology modifier C-36 dimer diamine (CDDH). In one or more embodiments, CDDH is a liquid viscosifier.

CDDH may be expressed in IUPAC (International Union of Pure and Applied Chemistry) type nomenclature as 9-nonyl-10-octyl-nonadecane-1,19-diamine·2HCl salt. CDDH may be described as a molecule with two octadecylamine·HCl salt moieties, linked by a carbon-carbon bond between position 9 of the first octadecylamine·HCl salt moiety and position 10 of the second octadecylamine·HCl salt moiety. CDDH has a 'main chain' that is nonadecane-1,19-diamine, with a nonyl group at position 9 and an octyl group at position 10 of the main chain. CDDH is an alkylammonium dimer having two primary alkylammonium ions per molecule. Meaning, CDDH has two ammonium head groups and two alkyl tail groups per molecule, where the dimer is connected along the tail groups. A structural representation of CDDH is shown as follows.

Structural Representation of CDDH

The composition may include a weighting agent. A weighting agent is generally the main solid constituent of a drilling fluid and is often used to increase the weight and hydrostatic pressure of drilling fluid. A weighting agent refers to finely divided solid material that is used to increase the density of the invert emulsion oil-based drilling fluid composition. Non-limiting examples of weighting agents include aragonite, bentonite, barite, barium chloride, barium hydroxide, barium oxide, barium sulfate, calcite, calcium carbonate, dolomite, hematite, ilmenite, iron carbonate, iron oxides, lead carbonate, manganese oxides, siderite, zinc carbonate, zinc oxide, zirconium oxide, and other various minerals. In one or more embodiments, the weighting agent is barite (BaSO$_4$). The weight ratio of the weighting agent may be in a range of from 10 to 50 wt % compared to the total weight of the composition.

The composition may include an alkaline source to adjust the alkalinity of the invert emulsion. The alkaline source may include compounds having a conjugate acid $pK_a$ between 4.8 and 10.6, for example. In some embodiments, the alkaline source may include but is not limited to lime, calcium hydroxide, an alkyl-carboxylate salt, a phenoxide salt, a thiophenolate salt, a thiolate salt, a cyanide salt, or a combination thereof. Lime is composed of oxides and hydroxides, which usually include calcium oxide, calcium hydroxide, or calcium oxide and calcium hydroxide. The alkaline source may also be a source of calcium (may include calcium). The weight ratio of the alkaline source may be in a range of from 0.05 to 5 wt % compared to the total weight of the composition. Without wanting to be bound by theory, an alkaline source including calcium may form a calcium salt with the emulsifier that may help to stabilize the emulsion, compared to an emulsion without an alkaline source including calcium.

The composition may include an emulsifier to produce a tight water-in-oil emulsion. In other words, the emulsifier may be utilized to consolidate the stability of the dispersed phase or the overall emulsion. The emulsifier may include a carboxylic acid and a hydrocarbon, or a carboxylic acid, an amide, and a hydrocarbon. Without wanting to be bound by theory, when an emulsifier includes carboxylate functional groups (such as from a carboxylic acid), and CDDH (with ammonium functional groups) are included together in the composition, tighter packing of the emulsifier may result, as compared to when an emulsifier does not include a carboxylate functional group. The tighter packing of the emulsifier may result in smaller droplets in suspension, contributing to the improved performance of the invert emulsion oil-based drilling fluid composition. In other embodiments, the emulsifier used or additionally used may include functional groups such as sulfates and sulfonates, among others.

Both the emulsifier and the CDDH are amphiphilic, meaning that they both have a polar functional group and a non-polar functional group. The polar carboxylate group of the emulsifier and the polar alkylammonium group of the CDDH may have affinity for (soluble in or chemically attracted to) the aqueous phase compared to the oil phase. The carboxylate group ($RCOO^-$) of the emulsifier and the alkylammonium group of the CDDH ($RNH_3^+$) are also oppositely charged and may attractively intermingle. Advantageously, this attractive interaction may lead to better packing of the emulsifier and the CDDH at the oil-water interface of the emulsion and may lower interfacial tension, compared to an emulsifier and CDDH that do not have an attractive interaction between them. As well, the non-polar groups (alkyl chains) of the CDDH may have affinity for the oil phase compared to the aqueous phase. Thus, the combination of attractive interaction between the emulsifier and the CDDH, and the attraction of CDDH non-polar groups with the oil phase may lead to ordered surface packing, smaller emulsion droplets, and emulsion stability, which may lead to an increase in in the rheology of the invert emulsion oil-based drilling fluid compared to a fluid without the emulsifier and CDDH of one or more embodiments.

The emulsifier may include but is not limited to LE SUPERMUL™ (Halliburton; Houston, Tex., USA), CARBO-MUL™ (Baker Hughes; Aberdeen, UK), INVER-MUL® (Halliburton; Houston, Tex., USA), VERSAMUL™ (trademark by M-I L.L.C.) (Schlumberger; Houston, Texas, USA), EZ MUL® (Halliburton; Houston, Tex., USA), or a combination thereof. For example, EZ MUL® is a hyper-branched polyamide terminated with carboxylic acid functional groups (such as carboxylate functional groups) and conjugated carboxylic acid functional groups (from a maleic acid ring opening process by an amine). EZ MUL® includes 60-100 wt % of a fatty acid (tall oil) based reaction product from diethylenetriamine, maleic anhydride, tetraethylenepentamine, and triethylamine, and 10-30 wt % of a hydrotreated light petroleum distillate. The weight ratio of the emulsifier may be in a range of from 0.1 to 10 wt % compared to the total weight of the composition.

The composition may include a filtration control agent. The filtration control agent may include, but is not limited to, lignites, leonardites, asphalts, gilsonites, polymeric fluids, and combinations thereof. In one or more embodiments, the filtration control agent is a modified lignite. A suitable example of a leonardite filtration control agent is Duratone® HT (Baroid, USA). Duratone® HT is an organophilic leonardite, which is a mineraloid oxidation product of lignite and is soluble in alkaline solutions. The weight ratio of the filtration control agent may be in a range of from 0.1 to 5 wt % compared to the total weight of the composition.

The composition may include a conventional viscosifier that is a solid viscosifier. As used herein, a "solid viscosifier" may be a solid or a mixture of a solid with a liquid. If in the form of a mixture of a solid with a liquid, the mixture may be a suspension of the solid in the liquid. The solid viscosifier may be present in a range of 0.05 wt % to 5 wt % of the total weight of the drilling fluid composition. The solid viscosifier may be an organophilic clay, such as an organophilic clay-based viscosifier that may further include silica, for example, crystalline silica (quartz). A content of silica in the solid viscosifier may be about 1 to 20 weight percent (wt %), such as 1 to 15 wt %, 1 to 10 wt %, and 1 to 5 wt %, compared to the total weight of the solid viscosifier. In one or more embodiments, the composition is free of solid viscosifier, such as organophilic clay viscosifier.

The solid viscosifier may also include an amine. The amine includes or consists of a tri-alkyl amine, for example, bis(hydrogenated tallow alkyl) methylamine. A content of amine in the solid viscosifier may be about 0 to 1 wt %, for example, a non-zero value up to about 1 wt %, or a non-zero value up to 1 wt % of the total weight of the solid viscosifier. The solid viscosifier may be, for example, GELTONE® II (Halliburton, USA), produced by Halliburton, USA. GELTONE® II is an organophilic clay treated with a quaternary ammonium surfactant. The solid viscosifier may have a specific gravity of from 1 to 5, such as from 1 to 4, 1 to 3, 1 to 2, 1.5 to 2, and 1.6 to 1.8.

When the CDDH and the conventional viscosifier are combined together in an invert emulsion oil-based drilling fluid composition, loadings of the conventional viscosifier may be reduced compared to a drilling fluid without the CDDH. Reduced loadings of conventional viscosifier may be up to a concentration of about 1 to 3 pounds per barrel (ppb). As a comparison, loadings of conventional viscosifier may be in a range of from about 1 ppb to about 5 ppb. In such a combination, a desired rheological property of the drilling fluid may be advantageously improved while maintaining the solids content of the drilling fluid. Further, in such a combination, a desired rheological property of the drilling fluid may be advantageously maintained while lowering the solids content of the drilling fluid. In these instances, the CDDH may act as a rheology booster to improve rheological properties of the conventional viscosifier or to compensate reduced loadings of the conventional viscosifier.

Method of Use

One or more embodiments of the present disclosure describe a method of introducing an invert emulsion oil-based drilling fluid composition into a wellbore.

The composition may be used with low density and medium density organoclay oil-based drilling fluid systems, or in drilling fluids that are organoclay free. In this instance, low density means from about 63 pounds per cubic foot (pcf) up to 90 pcf (about 1009 kilogram per cubic meter ($kg/m^3$) up to 1441 $kg/m^3$), and medium density means from 90 pcf to about 120 pcf (1441 $kg/m^3$ to about 1922 $kg/m^3$).

The method may be used for drilling deep wells where a temperature gradient is high. For example, the wellbore may have a temperature of up to 450° F. (232° C.) and a pressure of up to 30,000 pounds per square inch (psi) (207 megapascals (MPa)).

The composition according to one or more embodiments is mixed before introducing into a wellbore. The invert emulsion oil-based drilling fluid composition may be stored for up to one week or longer, such as up to about 6 months. The invert emulsion oil-based drilling fluid composition may also be recycled for reuse.

The composition is then introduced into a wellbore. Wellbore conditions are maintained for a period. The period may be up to about 96 hours, about 72 hours, about 48 hours, about 24 hours, about 20 hours, about 18 hours, and about 16 hours. "Maintaining wellbore conditions" relating to drilling fluid means that drilling operations may proceed, stop, or stop and resume. In this instance, drilling operations may include but are not limited to pumping, circulating, pressurizing, depressurizing, drilling, removing cuttings, sealing, cooling, lubricating, transmitting energy (hydraulic and otherwise), maintaining wellbore stability, and other techniques known in the art.

While maintaining wellbore conditions, the composition provides a rheological property, such as low-end rheology, of the invert emulsion oil-based drilling fluid that may be stable for the duration of the previously described step where wellbore conditions are maintained. Thus, the method of using the composition provides a stable rheological property. The rheological property of the drilling fluid may include but is not limited to viscosity at one or more shear rate, plastic viscosity, yield point, low shear yield point, and gel strength at one or more time period, sag factor, and combinations thereof. The time period that the composition will maintain the rheological property of the drilling fluid is 12-24 hours or more. An invert emulsion mud may be stable for a period of days, where stability relates to maintaining the rheological property of the drilling fluid.

For example, a viscosity relative to a shear rate may be from 15 to 100 centipoise (cP) at 600 rpm, from 10 to 85 cP at 300 rpm, from 5 to 75 cP at 200 rpm, from 1 to 50 cP at 100 rpm, from 0.1 to 20 cP at 6 rpm, and from 0.05 to 15 cP at 3 rpm.

In addition, a plastic viscosity may be in a range from 1 to 100 cP. A yield point may be in a range from 1 to 100 lb/100 $ft^2$ (pounds per hundred square feet) (about 0.05 to 5 kilograms per square meter ($kg/m^2$)). A low shear yield point may be 7 lb/100 $ft^2$ or greater such as from 7 to 15 lb/100 $ft^2$ (about 0.34 to 0.73 $kg/m^2$). A 10 second gel strength may be in a range from 0.1 to 20 lb/100 $ft^2$ (about 0.005 to about 1 $kg/m^2$). A 10-minute gel strength may be in a range from 0.1 to 25 lb/100 $ft^2$ (about 0.005 to about 1.2 $kg/m^2$). A 30-minute gel strength may be in a range of from 0.1 to 30 lb/100 $ft^2$ (about 0.005 to about 1.5 $kg/m^2$). A sag factor may be in a range of from 0.52 or greater.

Methods and procedures to measure viscosity at one or more shear rate, yield point, plastic viscosity, gel strength, and electrical stability are commonly known in the art.

EXAMPLES

Example 1: Synthesis of CDDH

The dihydrochloride salt of C-36 dimer diamine was synthesized by reacting C-36-dimer diamine with a stoichiometric amount of 12.1 normal (N) concentrated hydrochloric acid. The C-36 dimer diamine starting material (amine form) was obtained as Priamine™ 1074 (Croda International; East Yorkshire, UK).

54 grams (g) of C-36 dimer diamine (amine form, liquid) was introduced in a beaker. The beaker was kept in a cold-water bath at 15° C.]. The 12.1 N (aq.) concentrated hydrochloric acid was added to the amine solution in 1 mL increments, where the temperature fluctuated up to about 25 to 35° C., with constant stirring using a glass rod. A total of 17 milliliters (mL) of 12.1 N concentrated hydrochloric acid were added. The acid reacted with the amine to yield a semi-solid product. An orange-brown colored semi-solid product was collected by decantation, and was vacuum dried at 50° C. for 48 hours to remove residual water.

Example 2: Formulation of an Invert Emulsion Oil-Based Drilling Fluid Composition including CDDH For Example 2, the invert emulsion oil-based drilling fluid composition with CDDH was mixed according to Table 1. Example 2 included CDDH in a concentration of 3 pounds per barrel (about 0.5 wt %).

The order of addition and mixing time was as follows. Oil was initially added with mixing by a multimixer; 5 minutes later the emulsifier was added; 5 minutes later the alkaline source was added; 5 minutes later the organophilic clay viscosifier was added; 5 minutes later the filtration control agent was added; 5 minutes later a brine consisting of pre-mixed saline agent and water was added; 10 minutes later the weighting agent was added; and 5 minutes later the low end rheology modifier was added.

After addition and mixing, the composition was hot rolled at 121° C. (250° F.) for 16 hours.

The composition had a density of 1441 $kg/m^3$ (90 pcf), an oil to water (brine) ratio of 70:30 with respect to volume, and a water phase salinity (WPS) concentration of 250,000 part per million (ppm) of the calcium chloride-based brine.

TABLE 1

Composition Components of Example 2.

| Entry | Component | Chemical | Example amount (unit) | Estimated wt % |
|---|---|---|---|---|
| 1 | Oil | Diesel (fuel) | 158.1 barrels (bbl) | 45 wt % |
| 2 | Emulsifier | EZ MUL ® | 10 pounds per barrel (lbm/bbl) | 1.5 wt % |

TABLE 1-continued

Composition Components of Example 2.

| Entry | Component | Chemical | Example amount (unit) | Estimated wt % |
|---|---|---|---|---|
| 3 | Alkaline source | Lime | 1.5 lbm/bbl | 0.2 wt % |
| 4 | Organophilic clay viscosifier | Geltone ® II | 1 lbm/bbl | 0.2 wt % |
| 5 | Filtration control agent | Duratone ® HT | 5 lbm/bbl | 0.8 wt % |
| 6 | Saline agent | $CaCl_2$ | 29.8 lbm/bbl | 5 wt % |
| 7 | Water | $H_2O$ | 85.7 lbm/bbl | 13.5 wt % |
| 8 | Weighting agent | Barite | 211.5 lbm/bbl | 33.3 wt % |
| 9 | Low-end rheology modifier | CDDH | 3 lbm/bbl | 0.5 wt % |
| | | | Total: | 100 wt % |

Comparative Example 1: Formulation of an Invert Emulsion Oil-Based Drilling Fluid Composition without CDDH.

An invert emulsion oil-based drilling fluid composition was formulated as shown in Table 1, without CDDH. The composition shown in Table 2 had a density of 1441 kg/m³ (90 pcf), an oil to water ratio of 70:30 with respect to volume, and a water phase salinity (WPS) concentration of 250,000 ppm of the calcium chloride-based brine.

The procedure for addition, mixing, and hot rolling in Comparative Example 1 was the same as Example 2, except the low-end rheology modifier was not included.

TABLE 2

Composition Components of Comparative Example 1.

| Entry | Component | Chemical | Example amount (unit) | Estimated wt % |
|---|---|---|---|---|
| 1 | Oil | Diesel (fuel) | 160.8 barrels (bbl) | 45.5 wt % |
| 2 | Emulsifier | EZ MUL ® | 10 pounds per barrel (lbm/bbl) | 1.6 wt % |
| 3 | Alkaline source | Lime | 1.5 lbm/bbl | 0.2 wt % |
| 4 | Organophilic clay viscosifier | Geltone ® II | 1 lbm/bbl | 0.2 wt % |
| 5 | Filtration control agent | Duratone ® HT | 5 lbm/bbl | 0.8 wt % |
| 6 | Saline agent | $CaCl_2$ | 29.7 lbm/bbl | 4.7 wt % |
| 7 | Water | $H_2O$ | 85.7 lbm/bbl | 13.5 wt % |
| 8 | Weighting agent | Barite | 211.8 lbm/bbl | 33.5 wt % |
| | | | Total: | 100 wt % |

Experimental Results

Example 2 and Comparative Example 1 were characterized by rheology tests including viscosity (at 600 rpm, 300 rpm, 200 rpm, 100 rpm, 6 rpm, and 3 rpm shear rates), plastic viscosity, yield point, low shear yield point, and gel strength (at 10 seconds, 10 minutes, and 30 minutes). Example 2 was further characterized by static aging experiments. The experimental results are summarized in Table 3.

TABLE 3

Experimental Results.

| Entry | Result | Example 2 | Comparative Example 1 |
|---|---|---|---|
| 1 | Viscosity at 600 rpm shear rate | 64 cP | 50 cP |
| 2 | Viscosity at 300 rpm shear rate | 42 cP | 31 cP |
| 3 | Viscosity at 200 rpm shear rate | 33 cP | 23 cP |
| 4 | Viscosity at 100 rpm shear rate | 24 cP | 15 cP |
| 5 | Viscosity at 6 rpm shear rate | 9 cP | 5 cP |
| 6 | Viscosity at 3 rpm shear rate | 8 cP | 4 cP |
| 7 | Plastic Viscosity | 22 cP | 19 cP |
| 8 | Yield Point | 20 lb/100 ft² | 12 lb/100 ft² |
| 9 | Low Shear Yield Point | 7 lb/100 ft² | 3 lb/100 ft² |
| 10 | 10 second gel strength | 9 lb/100 ft² | 4 lb/100 ft² |
| 11 | 10-minute gel strength | 13 lb/100 ft² | 4 lb/100 ft² |
| 12 | 30-minute gel strength | 13 lb/100 ft² | 5 lb/100 ft² |
| 13 | Static Aging | 0.521 sag factor | — |

Viscosity. The viscosity was measured using a using a standard oilfield viscometer at the specified shear rates, such as a FANN® model 35 viscometer at 120° F. (49° C.). Procedures for determining viscosity with standard oilfield viscometer are well appreciated in the art.

Example 2 had a viscosity of 64 cP at 600 rpm, 42 cP at 300 rpm, 33 cP at 200 rpm, 24 cP at 100 rpm, 9 cP at 6 rpm, and 8 cP at 3 rpm shear rate. Comparative Example 1 had a viscosity of 50 cP at 600 rpm, 31 cP at 300 rpm, 23 cP at 200 rpm, 15 cP at 100 rpm, 5 cP at 6 rpm, and 4 cP at 3 rpm shear rate.

Plastic Viscosity. The plastic viscosity and the yield point are parameters from the Bingham plastic rheology model. Both plastic viscosity and yield point were calculated at 300 rpm and 600 rpm shear rates on a standard oilfield viscometer.

The plastic viscosity represents the viscosity of a fluid when extrapolated to infinite shear rate and is expressed in units of centipoise (cP), as shown in Equation 1. The plastic viscosity indicates the type and concentration of the solids in the invert emulsion fluid.

Plastic viscosity=(600 rpm reading)−(300 rpm reading)   Equation 1.

Example 2 had a plastic viscosity of 19 cP and Comparative Example 1 had a plastic viscosity of 22 cP.

Yield Point. The yield point is determined by extrapolating the Bingham plastic model to a shear rate of zero, which represents the stress to move the fluid. Yield point is expressed in units of pressure, such as pound per 100 square foot (lb/100 ft$^2$) (or converted to kg/m$^2$). The yield point indicates the cuttings carrying capacity of an invert emulsion fluid through the annulus. In other words, the yield point indicates hole cleaning ability of an invert emulsion fluid. A yield point greater than 15 lb/100ft$^2$ (about 0.73 kg/m$^2$) is considered good for drilling.

Yield point=(300 rpm reading)−(plastic viscosity)   Equation 2.

Example 2 had a yield point of 20 lb/100 ft$^2$ and Comparative Example 1 had a yield point of 12 lb/100 ft$^2$.

Low Shear Yield Point. The yield stress (Tau0) is a parameter from the Herschel Buckley rheology model. Yield stress (Tau0) is determined by fitting the Herschel Buckley model to a shear stress versus shear rate curve, which corresponds to the dial readings plotted against rpm determined with a standard oilfield viscometer. Yield stress (Tau0) is expressed in units of pressure, lb/100 ft$^2$ (or converted to kg/m$^2$). Yield stress (Tau0) can be estimated by calculating the low shear yield point value from Equation 3.

Low shear yield point=[2×(3 rpm reading)]−(6 rpm reading)   Equation 3.

Example 2 had a low shear yield point of 7 lb/100ft$^2$ (about 0.34 kg/m$^2$) and Comparative Example 1 has a low shear yield point of 3 lb/100ft$^2$ (about 0.15 kg/m$^2$).

Gel Strength. The gel strength is the shear stress measured at low shear rate after the invert emulsion fluid has set quiescently for a period of time, such as 10 seconds and 10 minutes according to the standard American Petroleum Institute (API) procedure for gel strength. Gel strength was measured at 10 seconds, 10 minutes, and also 30 minutes. The unit for gel strength is pressure in lb/100 ft$^2$ (or converted to kg/m$^2$).

Example 2 has a 10 second gel strength of 9 lb/100 ft$^2$ (about 0.44 kg/m$^2$), a 10-minute gel strength of 13 lb/100 ft$^2$ (about 0.63 kg/m$^2$), and a 30-minute gel strength of 13 lb/100 ft$^2$ (about 0.63 kg/m$^2$). Comparative Example 1 has a 10 second gel strength of 4 lb/100 ft$^2$ (about 0.2 kg/m$^2$), a 10-minute gel strength of 4 lb/100 ft$^2$ (about 0.2 kg/m$^2$), and a 30-minute gel strength of 5 lb/100 ft$^2$ (about 0.24 kg/m$^2$). A 10 second gel strength under about 10 lb/100 ft$^2$ and a 10-minute gel strength under about 15 lb/100 ft$^2$ may prevent barite sag with an ability to suspend cuttings in the drilling fluid in the instance where the fluid is kept static in the wellbore.

Static Aging. Static aging studies were performed on Example 2 to determine the sag-resistance of the fluid. The experimental procedure for static aging is as follows.

The invert emulsion fluid was mixed in a stainless-steel mixing cup using a five spindle multimixer. The fluid was then aged in a high pressure, high temperature stainless steel aging cell in a hot rolling oven at 141° C. (250° F.) for 16 hours. After hot rolling, the high pressure, high temperature aging cell was cooled to 25° C. and the fluid was then mixed on the multimixer for 5 minutes and subsequently placed back in the aging cell. The aging cell was then statically aged in a mechanical convection oven by applying 500 pounds per square inch (psi) (3.45 megapascal, MPa) pressure at 141° C. (250° F.) for 24 hours. Static aging of the invert emulsion fluid was performed by turning and placing the cell at 90° on its axis.

The sag performance of the fluid was assessed by determining the sag factor. The specific gravity of the top ($SG_{top}$) and bottom ($SG_{bottom}$) portion of the fluid in the aging cell was determined by drawing 10 milliliter (mL) aliquots and measuring their weights on an analytical balance. Equation 4 was used to calculate the sag factor for the statically aged fluid.

Equation 4.

$$SagFactor = \frac{SG_{bottom}}{SG_{bottom} + SG_{top}}. \quad \text{Equation 4}$$

In Equation 4, $SG_{bottom}$ is the density of the fluid at the bottom of the aging cell and $SG_{top}$ is the density of the fluid at the top of the aging cell.

Upon completion of the static aging study, Example 2 provided a sag factor of 0.521.

Advantages

One or more embodiments of the composition with CDDH resulted in improved low-end rheology, including improved low shear yield point, yield point, and plastic viscosity compared to a composition without CDDH.

For example, Example 2 showed a 133.3% improvement in low shear yield point, a 66.7% improvement in yield point, and a 15.8% improvement in plastic viscosity compared to Comparative Example 1. These results show that Example 2, with CDDH, improves low-end rheology (3 and 6 rpm readings) with a minimal increase in plastic viscosity compared to a related composition without CDDH (Comparative Example 1).

The improved low-end rheology in Example 2 will provide improved hole cleaning and barite sag resistance compared to Comparative Example 1. Advantageously, these improvements occur without excessive addition of low gravity solids like organoclay.

Additionally, fluids with a lower plastic viscosity have a reduced impact on equivalent circulating density and may lead to improved rates of penetration, compared to fluids with a higher plastic viscosity.

Yield stress (Tau0) indicates the susceptibility of the invert emulsion fluid to barite sag: a higher Tau0 is expected to deliver a sag resistant invert emulsion fluid than a lower Tau0. As previously discussed, yield stress can be estimated with low shear yield point (Equation 3). A good drilling fluid has a low shear yield point of 7 lb/100ft$^2$ (about 0.34 kg/m$^2$) or greater. A low shear yield point for the drilling fluid corresponds to improved hole cleaning and greater barite sag resistance compared a low shear yield point below 7 lb/100ft$^2$ (about 0.34 kg/m$^2$). The low shear yield point of Example 2, with CDDH, improves hole cleaning ability and barite sag resistance compared to a related composition without CDDH (Comparative Example 1).

Static aging studies performed on Example 2 resulted in a sag factor of 0.521 implying that the invert emulsion oil-based drilling fluid with CDDH is resistant to barite sag.

Unless defined otherwise, all technical and scientific terms used have the same meaning as commonly understood by one of ordinary skill in the art to which these systems, apparatuses, methods, processes, and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

The term "substantially", when used, refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it should be understood that another embodiment is from the one particular value to the other particular value, along with all particular values and combinations thereof within the range.

Although only a few example embodiments have been described in detail, those skilled in the art will readily appreciate that many modifications are possible in the example embodiments without materially departing from this disclosure. All modifications of one or more disclosed embodiments are intended to be included within the scope of this disclosure as defined in the following claims. In the claims, means-plus-function clauses are intended to cover the structures previously described as performing the recited function, not limited to structural equivalents, but also equivalent structures. It is the express intention of the applicant not to invoke 35 U.S.C. § 112(f) for any limitations of any of the claims, except for those in which the claim expressly uses the words 'means for' together with an associated function.

While one or more embodiments of the present disclosure have been described with respect to a limited number of embodiments, those skilled in the art, having benefit of this disclosure, will appreciate that other embodiments can be devised, which do not depart from the scope of the disclosure. Accordingly, the scope of the disclosure should be limited only by the attached claims.

What is claimed:

1. An invert emulsion oil-based drilling fluid composition, comprising:
   an invert emulsion of an oil phase and an aqueous phase, the oil phase including an oleaginous fluid; and
   a low-end rheology modifier that is a C-36 dimer diamine dihydrochloride salt.

2. The composition of claim 1, wherein the oleaginous fluid is one or more selected from the group consisting of a crude oil, a condensate, a light hydrocarbon liquid, a base oil, and diesel fuel.

3. The composition of claim 2, wherein the base oil is one or more selected from the group consisting of a linear alpha olefin, a cycloparaffin, a linear paraffin, and an N-alkane.

4. The composition of claim 1, wherein the aqueous phase comprises a saline agent.

5. The composition of claim 4, wherein the saline agent is one or more selected from the group consisting of calcium chloride, calcium citrate, calcium acetate, calcium nitrate, and calcium bromide.

6. The composition of claim 1, further comprising one or more selected from the group consisting of a weighting agent, barite; an alkaline source; an emulsifier; a filtration control agent; and a solid viscosifier.

7. The composition of claim 6, wherein the alkaline source comprises calcium and is one or more selected from the group consisting of lime, calcium hydroxide, an alkyl-carboxylate salt, a phenoxide salt, a thiophenolate salt, a thiolate salt, and a cyanide salt.

8. The composition of claim 6, wherein the emulsifier comprises a compound including a carboxylic acid functional group and a hydrocarbon.

9. The composition of claim 6, wherein the filtration control agent comprises leonardite.

10. The composition of claim 6, wherein the solid viscosifier is an organophilic clay-based viscosifier.

11. The composition of claim 1, wherein the invert emulsion oil-based drilling fluid composition provides a stable rheological property including one or more selected from the group consisting of viscosity at one or more shear rate, plastic viscosity, yield point, low shear yield point, gel strength at one or more time period, and sag factor for a period up to about 96 hours.

12. The composition of claim 1, wherein the viscosity relative to a shear rate is from 0.1 to 20 cP at 6 rpm.

13. The composition of claim 1, wherein the plastic viscosity is in a range from 1 to 100 cP.

14. The composition of claim 1, wherein the yield point is in a range from 1 to 100 lb/100 ft$^2$.

15. The composition of claim 1, wherein the low shear yield point is 7 lb/100 ft$^2$ or greater.

16. The composition of claim 1, wherein the gel strength is in a range from 0.1 to 30 lb/100 ft$^2$.

17. A method, comprising:
   introducing the invert emulsion oil-based drilling fluid composition according to claim 1 into a wellbore, wherein the wellbore has a temperature of up to 450° F. and a pressure of up to 30,000 pounds per square inch (psi).

18. The method of claim 17, wherein the invert emulsion oil-based drilling fluid composition further comprises one or more selected from the group consisting of a saline agent; a weighting agent, barite; an alkaline source; an emulsifier; a filtration control agent; and a solid viscosifier.

* * * * *